Patented Oct. 30, 1934

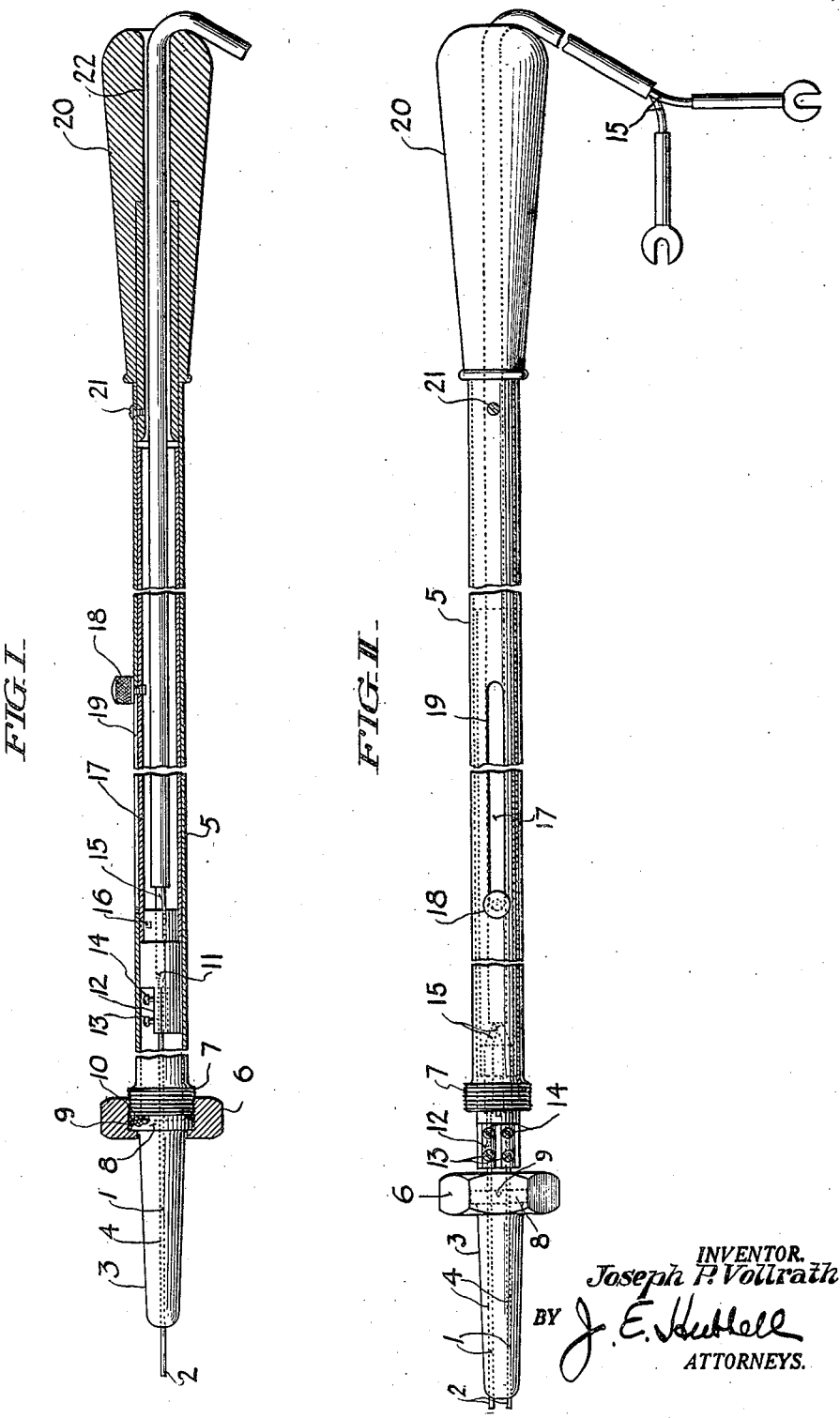

1,979,085

UNITED STATES PATENT OFFICE 1,979,085

THERMOCOUPLE

Joseph P. Vollrath, Philadelphia, Pa., assignor to The Brown Instrument Company, Philadelphia, Pa., a corporation of Pennsylvania Application December 6, 1930, Serial No. 500,552

8 Claims. (Cl. 136—4)

This invention relates to a device for measuring high temperatures, more specifically to a thermocouple for measuring the temperature of molten metals.

Molten metals when used for pouring molds, and especially for die casting, must be within a relatively few degrees of optimum temperature in order to obtain satisfactory results, otherwise the molded article may be inferior in finish or may fail to come within the limits of tolerance specified. The temperature of molten metal in a pouring ladle falls rapidly and the permissible pouring range of temperature is narrow, therefore a device for accurately measuring the temperature of the molten metal is highly desirable, and it is necessary that the temperature measuring device respond quickly to the temperature measured. In order to obtain a temperature measurement representative of the body of metal, it is necessary to subject the temperature responsive element to the temperature of metal sufficiently beneath the surface of the metal to obtain a representative temperature.

Heretofore it has been common to provide thermocouples to be immersed in the molten metal to obtain the temperature thereof. Such thermocouples have in some instances been enclosed in a metal protecting shield, but the use of such protecting shield delays the time of response of the thermocouple to the temperature of the metal so greatly as to vitiate its usefulness for the metal passes through its permissible pouring range of temperature before the thermocouple has had sufficient time to attain the temperature of the metal. Also, thermocouples of bare wire twisted together at their ends have been employed for immersion in the metal, but inasmuch as the metal is a conducting medium those portions of the wires beneath the surface are short circuited and the thermocouple generates an electromotive force proportional to the surface temperature of the metal which is not representative of the temperature throughout the body of the metal. Also, thermocouple wires covered with insulation, except at their tips, have been immersed separately in the molten metal, the electrical circuit being completed through the metal; however, the insulation deteriorates rapidly and falls away from the thermocouple wire adjacent the tips thereof so that the bare wire is exposed throughout its extent of immersion in the molten metal and the condition of measuring surface temperature prevails.

It is an object of this invention to provide a thermocouple which will respond with sufficient rapidity to the temperature of material to be measured and which may be brought into contact with molten metal beneath the surface thereof so as to measure a temperature representative of that throughout the body of the metal. It is also an object of this invention to provide a thermocouple which is easy to manufacture and in which the parts subject to deterioration may be conveniently and inexpensively replaced. Other objects and advantages of the present invention will appear in the detailed description taken in connection with the accompanying drawing in which Fig. 1 is a longitudinal section of the thermocouple of this invention, the parts being in assembled relation;

Fig. 2 is an elevation of the thermocouple of this invention, the parts being in partly disassembled relation.

In order to obtain the quickest possible response by the thermocouple to the temperature to be measured, it is necessary to present an exposed, unprotected portion of the couple which may be brought into contact with the metal the temperature of which is to be measured. Accordingly, the couple wires 1 have bare ends 2 which may be brought into electrical contact if desired, but it is preferred to complete the electrical circuit through the metal the temperature of which is being measured. Where the thermocouple of this invention would be used to measure the temperature of non-conducting molten materials the thermocouple wires 1 may be brought together at their bare ends 2.

In order that the thermocouple may be used to measure temperature of molten material below the surface of molten metal, it is necessary to provide for the protection of the couple wires, at least along those portions adjacent the exposed ends of the wires which are brought into contact with the metal. Such protection is afforded according to this invention by a shield 3 provided with passages 4 through which the thermocouple wires 1 extend. The shield 3 may be of any refractory material having the capacity to withstand the temperature of molten metals and according at least sufficient dielectric strength to insulate such voltages as are generated by thermocouples at the high temperatures to which they are exposed in measuring the temperature of molten metal. A suitable material of which the shield 3 may be made is that known by the trade name "Electrobestos" which is made up in varying portions, according to the use to which it is put, of a refractory clay and an asbestos fibre binder which are molded under high pressure and baked at high temperatures, producing a mechanically strong material at high temperatures and having sufficient dielectric strength for the purpose to which it is put according to this invention. The shield 3 is thimble shaped so that the couple ends 2 may be immersed a substantial distance below the level of the molten metal with the shield 3 providing protection for those portions of the couple wires adjacent the ends while the supporting structure for the shield and couple wires are sufficiently removed from the metal as not to be deleteriously affected thereby.

The shield 3 is secured to a supporting frame or handle 5 by a collar 6 having threads adapted to engage the threaded extremity 7 of the support 5. The shield 3 has the head 8 with which the collar 6 cooperates to clamp the shield to the supporting handle. The head 8 of the shield 3 is provided with a slot 9 extending diametrically across the end of shield 3, and the supporting handle 5 is provided with pins 10 which fit into the slot 9. The slot 9 and pins 10 when in register locate the shield 3 at a definite position relative to the handle.

Couple wires 1 extending through passages 4 and the shield 3 are connected to a terminal block which preferably is formed of an electrical insulating material and is provided with conducting terminals 12 into which extremities of the couple wires 1 are secured by set screws 13. An electrical circuit for the pyrometer is completed through the set screws 14 which clamp the ends of lead conductors 15 into the conducting terminals 12. The conducting leads 15 extend from the thermocouple to the pyrometer.

Inasmuch as the exposed ends 2 of the couple wires 1 are subjected to the action of the molten metal or other molten material, the temperature of which is being measured, the ends 2 deteriorate rapidly and must be replaced frequently. In order to provide for the replacement of the couple ends 2, the couple wires 1 are made of considerable length and the terminal block 11 is arranged for movement longitudinally of the support or handle 5 so that by movement of the terminal block 11 more of the couple wires 1 may be advanced through the passage 4 in the shield 3 thereby replacing the burned off ends 2 of the couple.

In order to provide for the convenient manipulation of the terminal block 11 so as to advance the couple wires 1 when necessary, the terminal block 11 is secured by the screw 16 to member 17 which preferably is shaped to fit the interior of the support or handle 5, both the members 5 and 17 preferably being tubular. The member 17 is provided with a thumb screw 18 extending through slot 19 in support or handle 5. When slot 9 of the shield registers with pins 10 the passages 4 align with couple wire 1 and thumb screw 8 registers with slot 19. By manual manipulation of the thumb screw 18, the member 17 may be slidably moved along the axis of the support 5 to adjust the couple wires 1 so as to provide the proper extent of exposed couple ends 2. If desired, the support or handle 5 may be provided with a grip portion 20 secured thereto by screw 21 and provided with a passage 22 through which the conductor leads 15 may extend. The passage 22 and the tubular nature of the member 17 accommodate the flexible leads 15 which are moved in and out of the support or handle 5 as the terminal block 10 is adjusted by manipulation of thumb screw 18.

As will be evident from the description of the mounting for the shield 3, it is readily demountable by merely loosening the collar 6. The ready removability of the shield 3 allows it to be replaced conveniently, when, after a long period of service, the shield 3 has deteriorated sufficiently to make necessary its replacement. In addition, by loosening the collar 6 to dismount the shield 3, as shown best in Fig. 2, the terminal block 11 may be moved so as to extend from the end of the support or handle 5 in which position the screws 13 are readily accessible so that the stub ends of the couple wires 1, after having been used up, may be removed and new couple wires inserted in place thereof. This interchange of couples is made, as is evident, with extreme ease. Preferably the slot 19 and thumb screw 18 are so arranged as to limit the movement of the terminal block 11 to that shown in Fig. 2, so that it may not be drawn completely out of the support 5 and thereby be exposed to risk of accidental damage.

From the above description and by way of illustration of the device of this invention, it is seen that a thermocouple is provided which is effective in measuring temperatures of molten materials, especially molten metals below the surface thereof at a point the temperature of which is representative of the body of the metal. A thermocouple has been provided in which the parts affected by the metal may be renewed readily. The device is simple and rugged in construction and having all the essentials necessary for the use to which it is to be put. While the device of this invention has been disclosed by way of illustration, it is obvious to those skilled in the art that modifications may be made in many of its parts without departing from the scope and spirit of the invention. What I claim is my invention, is as follows:

1. A portable thermocouple comprising in combination, a hollow handle, a terminal block axially adjustable in said handle, thermocouple conductors secured to said block, a thermocouple protective part secured to and extending away from one end of said handle and formed with passages through which said conductors extend and from which their exposed ends project more or less according to the adjustment of said block in said handle, said part being formed of refractory dielectric material adapted to withstand immersion in molten material and to insulate the portions of the conductors within said passage from one another.

2. A portable thermocouple comprising in combination a hollow handle, a terminal block axially adjustable in said handle, thermocouple conductors secured to said block and extending out of said handle at one end and conducting leads connected to said block and extending out of said handle at its opposite end, a protective part secured to and extending away from said one end of said handle and formed with passages through which said conductors extend and from which their exposed ends project more or less according to the adjustment of said block in said handle, said part being formed of refractory dielectric material adapted to withstand immersion in molten material and to insulate the portions of the conductors within said passage from one another.

3. A portable thermocouple comprising in combination a hollow handle, a terminal block axially adjustable in said handle, thermocouple conductors secured to said block and extending out of said handle at one end and conducting leads connected to said block and extending out of said handle at its opposite end, a protective part detachably secured to and extending away from said one end of said handle and formed with passages through which said conductors extend and from which their exposed ends project more or less according to the adjustment of said block in said handle, said part being formed of refractory dielectric material adapted to withstand immersion in molten material and to insulate the portions of the conductors within said passage from one another, and said block being removable from said handle through said one end of the latter when said part is detached.

4. A thermocouple for molten metals having an exposed tip, a refractory shield protecting that portion of the couple adjacent the tip from the metal, a support carrying said shield and more remote than said shield from said tip whereby the latter and the portion of said shield adjacent said tip may extend into contact with molten metal without contact of the latter with said support, a terminal block carried by the support, said couple being connected to said block, conductors connected to the block and leading from the support, said couple, block and leads being adjustable relative to the shield to change the exposed portion.

5. A thermocouple for molten metals having an exposed tip, a refractory shield protecting that portion of the couple adjacent the tip from the metal, a support carrying said shield and more remote than said shield from said tip whereby the latter and the portion of said shield adjacent said tip may extend into contact with molten metal without contact of the latter with said support, a terminal block carried by the support, said couple being connected to said block, conductors connected to the block and leading from the support, said couple, block and leads being adjustable relative to the shield to change the exposed portion, said shield being demountable to permit replacement of the couple.

6. A thermocouple having an exposed tip, a refractory shield surrounding that portion of the couple adjacent the tip for protection from the metal, a tubular handle supporting said shield demountably and more remote than said shield from said tip whereby the latter and the portion of said shield adjacent said tip may extend into contact with molten metal without contact of the latter with said handle, a terminal block within said handle, the couple being connected to said block, conductors connected to said terminal block and extending from said handle, said couple, block, and conductors being adjustable longitudinally of the handle to change the exposed portion of the couple, said terminal block being accessible for replacing the couple when the shield is demounted.

7. A portable thermocouple for measuring the temperature of molten metal, comprising a handle, a part of refractory dielectric material adapted to withstand immersion in said molten metal secured to one end of said handle and forming a longitudinal extension of the latter and formed with two longitudinal spaced apart passages, thermocouple conductors extending through and longitudinally adjustable in said passages with their end portions projecting from the end of said part remote from said handle bare and spaced away from one another, and terminal conductors for and connected to said thermocouple conductors and mounted in said handle for longitudinal adjustment in the latter, whereby said thermocouple conductors may be advanced through said part to compensate for their wastage produced by contact with said molten metal.

8. A thermocouple for insertion in molten metal and having a rigid shield for portions of the thermocouple adjacent its tip and below the surface of the molten metal, said shield consisting of refractory clay and asbestos fibres distributed with substantial uniformity throughout the clay.

JOSEPH P. VOLLRATH.